United States Patent Office 3,196,133
Patented July 20, 1965

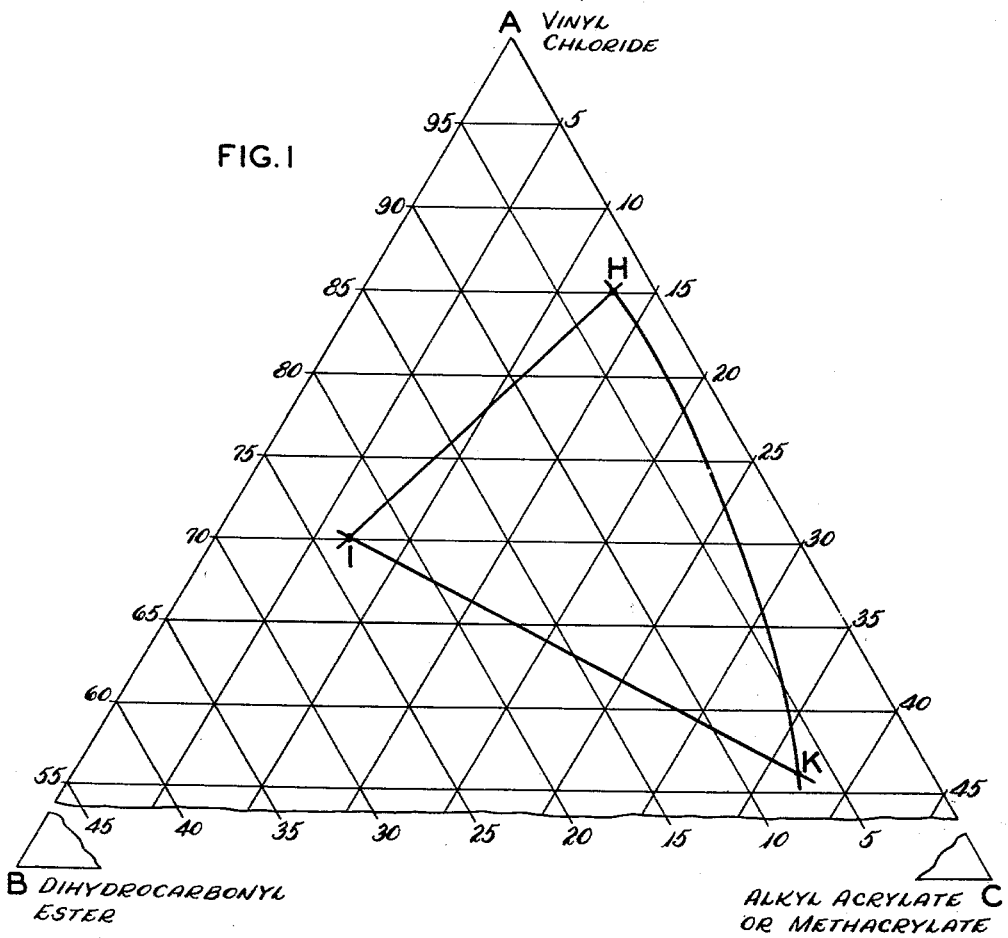
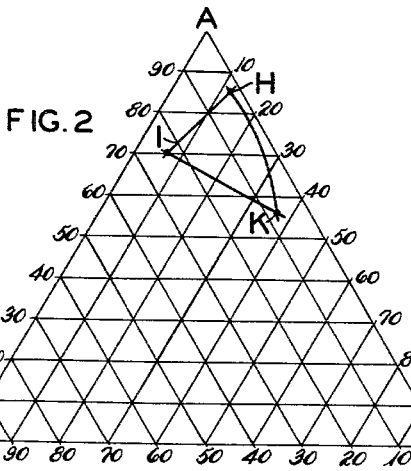
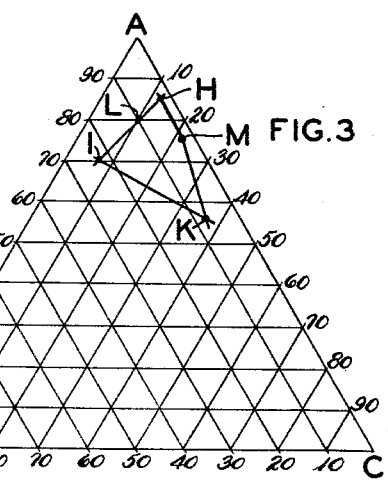

3,196,133
POLYMER COMPOSED OF VINYL CHLORIDE, A DIHYDROCARBONYL ESTER OF A MONOETHYLENICALLY UNSATURATED DICARBOXYLIC ACID, A MONOHYDROGEN, MONOHYDROCARBONYL ESTER OF A MONOETHYLENICALLY UNSATURATED POLYMERIZABLE DICARBOXYLIC ACID, AND AN ESTER OF ACRYLIC OR METHACRYLIC ACIDS
Robert A. Piloni and George P. Rowland, Jr., Pottstown, Pa., assignors to The Firestone Tire & Rubber Company, Akron, Ohio, a corporation of Ohio
Filed Feb. 7, 1962, Ser. No. 172,066
10 Claims. (Cl. 260—78.5)

This invention relates to novel polymers of vinyl chloride having novel properties particularly designed for application from solvents to yeild coatings, paints, lacquers, inks, adhesives and the like having simultaneously good adhesiveness and flexibility.

Vinyl chloride resins have entered into extensive usage as coatings on metal and other surfaces. The requirements in such applications are both exacting and multifarious. The resins must be soluble, for application, in relatively cheap solvent compositions, preferably those based upon hydrocarbons; in the resultant solutions and in the coatings deposited therefrom, they should be compatible with alkyd resins; the coatings deposited therefrom should be tightly adherent to metallic and other surfaces to which they may be applied; and, particularly when the metallic or other surfaces to which they are applied (for instance sheet metal) is to be subjected to flexing, bending or forming operations, the coatings should have a large degree of flexibility and elasticity (without impairment of surface hardness) so as to comply with the resultant deformations. It is difficult to achieve simultaneously all of these desired properties in a single resin; measures taken to enhance one of the desired properties will often detract from one or more of the other properties, and vice versa.

Accordingly, it is an object of this invention to provide a novel vinyl chloride resin for application from solvent solutions as coatings, paints, lacquers, inks, adhesives and the like.

Another object of this invention is to provide such a resin which will have simultaneously good solubility in cheap hydrocarbon solvents, compatibility with alkyd resins in such solutions and also in the solid coatings deposited therefrom, tight adhesion to metal and other surfaces and, most importantly of all, coupled with the foregoing properties, a suitable degree of flexibility and elasticity to permit the flexing, bending, forming, drawing and other forming operations which it may be desired to carry out upon sheet metal and other materials upon which the resins may be coated.

The invention will be described in connection with the attached drawing, wherein FIG. 1 is a fragment of a trilinear diagram of the components entering into the resins of this invention, and FIG. 2 is the entire diagram, of which FIG. 1 is a fragment, on a reduced scale.

SYNOPSIS OF THE INVENTION

The above and other objects are secured, in accordance with this invention, in vinyl chloride resins which are copolymers of vinyl chloride with other monomers within certain compositional limits as follows:

(A) Vinyl chloride.
(B) A di-hydrocarbonyl ester of a monoethyienically unsaturated,polymerizable dicarboxylic acid, which acid contains 4–10 carbon atoms, in which ester the esterifying hydrocarbonyl groups each contain 1–10 carbon atoms, or a mixture of esters of this type.
(C) An alkyl ester of acrylic or methacrylic acid in which the alkyl group contains 6–12 carbon atoms, or a mixture of such esters.

The percentages of (A), (B) and (C), based on the sum of the weights of (A), (B) and (C) must lie within the area bounded by the figure HIK of Fig. 1. Total weight of (A), (B) and (C) equals_____ 90–99%

(D) A mono-hydrogen, monohydrocarbonyl ester of a monoethylenically unsaturated polymerizable dicarboxylic acid, which acid contains 4–10 carbon atoms, in which ester the esterifying hydrocarbonyl group contains 1–10 carbon atoms, or a mixture of esters of this type_____ 10–1%

Based on the weight of (A), (B), C) and (D).

Preferably, measures are taken to control the polymerization so that the relative viscosity of the resin in 1% solution in cyclohexanone, is 1.1 to 1.7 This can be accomplished by copolymerizing the principal ingredients along with a small proportion of trichloroethylene or other halohydrocarbons, by adding chain transfer agents to the polymerization mass, or by polymerizing at high temperatures, these factors being concomitantly variant. The resins of this invention are readily and stably soluble in cheap solvent systems containing large amounts of hydrocarbon solvents; are compatible with alkyd resins in such solutions and in films deposited from such solutions; and form tightly adherent coatings upon metal and other substrates. Likewise the resins, while being suitably hard and mar-resistant, are sufficiently flexible to allow for the deformation of the substrate in forming and other fabricating operations. The resins of this invention are used as coatings, particularly on sheet metal which is first coated and thereafter subjected to drawing and forming actions, as in the manufacture of automotive instrument panels and the like.

THE PROPORTIONS OF THE COMONOMERS

The criteria of suitability of the proportions of the comonomers entering into the resins of this invention is that the resultant resins (1) shall be readily soluble in the usual coating solvents (2) shall not have excessive plasticity and (3) shall not be unduly stiff. Standards for these criteria which have been evolved in connection with this invention are respectively as follows:

(1) With regard to the solubility of the resins, a 20% solution of the resin in a mixture of 90% toluene/10% methyl ethyl ketone shall have a viscosity of less than 600 cps. as measured on a Brookfield viscosimeter at 25° C. with a No. 2 spindle at 30 r.p,m.

(2) With respect to plasticity, if a 0.5 gram sample of the resin is pressed between cellophane sheets in a flat-platen press at 120° C. under a total load of 2515 lbs. for 30 seconds, the area of the resultant plaque shall not exceed 3500 sq. mm.

(3) With regard to stiffness, the resin shall not have a bending modulus of elasticity (ASTM Method D–947–50, samples milled and pressed into ⅛″ plaques and one-half inch strips for the test cut from the plaques) in excess of 150,000 p.s.i.

The manner in which these properties depend upon the proportions of the monomers will be seen in FIG. 1, which is a fragment of a trilinear diagram[1] of the components (A) vinyl chloride/(B) dihydrocarbonyl esters/ (C) alkyl acrylate or methyacrylate. Plotted thereon are contours IK of plasticity=3500 sq. mm.; HI of modulus less than 150,000 p.s.i.; and KH of viscosity less than 600 cps., based upon experiments of Example XII below in which the levels of monohydrogen, mono-n-butyl maleate are at 3% and 8%, on the total weight of all of the monomers. In plotting the chart, the monohydrogen maleate is not treated as a variable,

| | |
|---|---|
| (B) A dihydrocarbonyl ester of a monoethylenically unsaturated dicarboxylic acid in which the esterifying hydrocarbonyl groups each contain 1–10 carbon atoms, or a mixture of esters of this type. | (B) Dihydrocarbonyl ester. |
| (C) An alkyl ester of acrylic or methacrylic acid in which the alkyl group contains 6–12 carbon atoms, or a mixture of such esters. | (C) Alkyl acrylate or methacrylate. |
| (D) A monohydrogen, monohydrocarbonyl ester of a monoethylenically unsaturated polymerizable dicarboxylic acid in which the esterifying hydrocarbonyl groups contain 1–10 carbon atoms, or a mixture of esters of this type. | (D) Monohydrocarbonyl ester. |

[1] In the diagram of Fig. 1 and in the discussion to follow, the several components set forth above will be referred to, for brevity, as follows:

and the points are plotted as percentages based on the sum of the vinyl chloride, maleate ester and acrylic ester; thus Run No. 13 of this example, which contains (based on the weight of all monomers, including the monohydrogen ester) 70% vinyl chloride, 12% dibutyl maleate, 15% ethyl hexyl acrylate and 3% monohydrogen mono-n-butyl maleate, is plotted as $$\frac{70}{70+12+15} \times 100\% = 72.1\%$$

vinyl chloride, $$\frac{12}{70+12+15} \times 100\% = 12.4\%$$

dibutyl maleate and $$\frac{15}{70+12+15} \times 100\% = 15.5\%$$

ethyl hexyl acrylate. The operative areas of this invention will thus be seen to lie inside the irregular figure HIK, which may be approximated by the polygon HL/IKM (plotted in FIG. 3 only), the vertices of which are as follows:

*Table A*

MONOMER PERCENTAGES

| Vertex | Vinyl chloride | Maleic, fumaric, etc. dihydrocarbon ester | Acrylic ester |
|---|---|---|---|
| H | 85.0 | 2.2 | 12.8 |
| L | 77.3 | 12.4 | 10.0 |
| I | 70 | 23.5 | 6.5 |
| K | 56.0 | 7.0 | 37.0 |
| M | 76.1 | 2.2 | 21.7 |

Variations in the level of the monohydrogen, monohydrocarbonyl ester within the range of 1–10% based on the total weight of monomers A, B, C and D, does not substantially change the outline of the figure HIK. On the basis of the above considerations, therefore, proportions of monomers suitable for the polymers of this invention will be those in which:

(I) The percentages of (A) vinyl chloride; (B) dihydrocarbonyl ester; and (C) hydrocarbonyl acrylate or methacrylate, based upon the total weight of (A), (B) and (C) *excluding* (D) the monohydrocarbonyl ester lie within the figure HIK of the drawing; and (II) The monohydrocarbonyl ester D constitutes 1–10%, based upon the total weight of (A), (B), (C) and (D).

THE DIHYDROCARBONYL ESTERS (B)

The dicarboxylic acids from which the acyl portions of these esters are derived may be any ethylenically unsaturated dicarboxylic acids in which the ethylenic groups are adapted to copolymerize with other ethylenically unsaturated monomers by way of a free radical mechanism. In the esters these acyl portions have their carboxylic groups esterified with any hydrocarbonyl groups containing 1–10 carbon atoms. By the term "hydrocarbonyl" groups, it is intended to designate radicals made up of carbon and hydrogen, the attaching point of the group as a whole being by way of a valence bond to one of the carbons of the radical. Examples of such hydrocarbonyl radicals are alkyl and cycloalkyl radicals such as methyl, ethyl, n-propyl, isopropyl, n-butyl, sec-butyl, t-butyl, n- and other isomeric pentyl, n-hexyl, cyclohexyl, n-octyl and 2-ethyl hexyl groups, and the various commercial mixtures of such groups obtained from petroleum fractions and the like; and aryl, alkaryl and aralkyl groups such as phenyl, benzyl, phenylethyl, tolyl, xylyl, naphthyl and the like. Examples of unsaturated dicarboxylic acids from which the acyl portions of the esters may be derived include those containing two carboxylic acid groups and an ethylenic linkage capable of copolymerizing by a free-radical addition with other ethylenically unsaturated compounds, the acid as a whole containing 4–10 carbon atoms. Examples of such acids are maleic acid, chloromaleic acid, fumaric acid, chlorofumaric acid, itaconic acid, citraconic acid, and acids produced by Diels-Alder adduction of conjugated diolefins with acids of this type, for instance 1,2,3,6-tetrahydrophthalic acid, 3,6-endomethylene-1,2,3,6-tetrahydro-cis-phthalic acid, 7-oxabicyclo-(2,2,1)-5-heptene 2,3-dicarboxylic acid and the like. Examples of suitable esters include for instance, dimethyl maleate, dimethyl fumarate, dimethyl chloromaleate, diethyl maleate, di-n-butyl maleate, di-sec-butyl fumarate, di-n-propyl maleate, diisopropyl maleate, di(2-ethyl hexyl)maleate, di-(2-ethyl hexyl fumarate (these last two esters and commercial mixtures containing them in various proportions have been found to give particularly outstanding products) di-(cyclohexyl)maleate, diphenyl maleate, dibenzyl maleate and di-ortho-, -para-, -meta-tolyl maleate and dimethyl 1,2,3,6-tetrahydro-cis-phthalate, and di-n-butyl 3,6-endomethylene-1,2,3,6-tetrahydro-cis-phthalate.

THE ALKYL ESTER OF ACRYLIC OR METHACRYLIC ACID (C)

This component of the polymer may be any alkyl ester of acrylic or methacrylic acid in which the alkyl groups contain 6–12 carbon atoms. Examples of such esters are alkyl and cycloalkyl esters of these acids, 2-ethyl hexyl acrylate, 2-ethyl hexyl methacrylate, 2-cyclohexyl acrylate, n-hexyl methacrylate, n-octyl acrylate, n-decyl acrylate, n-dodecyl acrylate, the acrylates and methacrylates of commercial mixed alcohols derived by the oxo process from petroleum fractions and the like. Again it will be

THE MONOHYDROGEN-MONOHYDROCARBONYL ESTERS (D)

These may be homologs of any of the esters discussed above under the heading "The Dihydrocarbonyl Esters B" in which one of the esterifying hydrocarbonyl esters has been replaced by a hydrogen atom, i.e., they are monohydrogen, monohydrocarbonyl esters of the same acids discussed in that connection. The single hydrocarbonyl groups with which the acids are esterified may be any of the hydrocarbonyl groups set forth in discussing the dihydrocarbonyl esters. The free carboxylic acid groups and hydrocarbon-esterified carboxylate groups so introduced into the polymeric chain providing a balance of adhesiveness on the one hand and affinity with the other monomers on the other hand. Exemplary specific esters includes for instance methyl hydrogen maleate, n-butyl hydrogen maleate (best results to this time have been with this ester), n-propyl hydrogen maleate, n-propyl hydrogen fumarate, benzyl hydrogen maleate, cyclohexyl hydrogen maleate, 2-ethyl hexyl hydrogen maleate, methyl hydrogen 1,2,3,6-tetrahydro-cis-phthalate, methyl acid ester of 3,6-endomethylene - 1,2,3,6 - tetrahydro-cis-phthalic acid, secondary butyl acid ester of 3,6-endomethylene-1,2,3,6-tetrahydro-cis-phthalic acid, and the like. A special class of these esters are those based upon the acids produced by the Diels-Alder adduction of conjugated olefins with unsaturated dicarboxylic acids as discussed above in connection with the dihydrocarbonyl esters, specific esters of this type being the four last named in the preceding sentence. Acid esters of such adduct acids have the advantageous property, when copolymerized in the resins of this invention, of not forming gels with alkaline pigments or epoxidized materials which may be present in solutions along with the resins. The hydrocarbon radicals containing 1–10 carbon atoms with which these acids are to be esterified may be any of those which are suitable components of the dihydrocarbon maleic etc. esters discussed above.

THE PREPARATION OF THE RESINS OF THIS INVENTION

The polymeric resins of this invention may be prepared by mixing together the monomeric constituents and subjecting them to any of the usual polymerization systems and conditions, for instance in solution in solvents, in emulsion in aqueous media, or in suspension in aqueous media, using free-radical-generating catalysts and conditions. In practical production, it is preferred to polymerize the monomers in aqueous suspension. In general this technique involves suspending the monomers in an aqueous medium containing non-micelle-forming suspending agents. Suspending agents suitable for this purpose are hydrophilic high polymeric materials such as gelatin, polyvinyl alcohol, polyacrylic acid, polymaleic acid, copolymers of maleic acid, methyl cellulose, polymeric tertiary amine phosphates, and the like. The aqueous medium constitutes about at least half of the entire polymerization mass. The reaction is promoted by the presence of free-radical-generating agents soluble in the monomer phase of the suspension, such as benzoyl peroxide, perbenzoic acid, p-chlorobenzoyl peroxide, t-butyl hydroperoxide, lauroyl peroxide, caproyl peroxide, capryl peroxide and the like. The aqueous phase and the monomer phase are agitated together so as to suspend the latter in the former, and the temperature of the mass is adjusted to values such as to initiate the polymerization reaction, usually on the order of 30°–100° C. The monomers in the suspended droplets become polymerized, yielding a suspension of granular resin in the aqueous medium. From this aqueous suspension the resin is isolated mechanically, as by filtration, centrifugation or the like.

MOLECULAR WEIGHT MODIFYING COMONOMERS, REAGENTS AND TECHNIQUES

As noted above, it is desirable to conduct the polymerization in such a way that the relative viscosity at 25° C. of the polymeric product, in a solution in cyclohexanone containing 1% of the polymer, based on the weight of solution, shall be in the range 1.1 to 1.7. This may be accomplished by incorporating, into the monomers entering the reaction, various materials which tend to lower the molecular weight, or by conducting the reaction at uncustomary high temperatures. For instance trichloroethylene, when copolymerized with the other monomers to the extent of 1.0–6.5%, based on the total weight of monomers (A), (B), (C) and (D) as listed above (excluding the trichloroethylene) in the reaction medium, will bring the molecular weight of the polymer down to the desired range. Likewise there may be employed chain-transfer agents in the polymerization mass, such as saturated halogenated hydrocarbons, preferably those containing from 1 to 4 carbons, examples of these being the halogenated methanes such as carbon tetrachloride, carbon tetrabromide, bromochlorodifluoromethane, bromoform, methyl chloride, methyl bromide, methyl iodide, chloroform, iodoform, methylene dichloride, methylene dibromide and the like, halogenated ethanes such as ethyl chloride, 1,1,2-trichloroethane, 1,1,2,2-tetrachloroethane, ethylene chloride, ethylene bromide, ethyl bromide, ethyl iodide, 1,1,2-trichloro-2-fluoroethane, 1,1,2-tribromoethane, 1,1-dichloro-2-bromoethane, pentachloroethane and the like, and halogenated propanes and butanes such as n-propyl chloride, n-propyl iodide, isopropyl chloride, isopropyl bromide, n-butyl chloride, 1,4-dichlorobutane, t-butyl chloride, and the like. Suitable halogenated hydrocarbons containing more than 4 carbon atoms include, for instance, amyl chloride, dodecyl chloride and the like. Likewise there may be employed any halogenated ethylenically unsaturated hydrocarbon other than monomeric type compounds which will polymerize without reducing the molecular weight. Vinyl chloride itself, vinyl bromide, vinyl fluoride, vinyl iodide, vinylidene chloride, vinylidene bromide, vinylidene iodide, vinylidene chlorobromide, vinylidene chloroiodide, vinylidene bromoiodide, vinylidene fluoroiodide, vinylidene fluorobromide, and vinylidene fluorochloride are monomers in their own right, and are not to be considered as molecular weight modifiers for the purpose of this invention. Trichloroethylene, discussed separately above, is one suitable halogenated unsaturated hydrocarbon. Other suitable unsaturated halogenated hydrocarbons will be seen to include for instance cis- and trans-1,2-dichloroethylene, cis- and trans-1,2-dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3-dichloro-1-propene, 3,3-dichloro-1-propene, 2,3-dibromo-1-propene, 1-chloro-2-butene, 1-chloro-2-decene, 1-chloro-2-octadecene, and the like. In general, it will be preferred to employ those unsaturated halogenated hydrocarbons containing from 1 to 4 carbon atoms, although higher molecular weight compounds may also be used. It will be understood that, instead of a single pure compound tending to reduce the molecular weight, there may be employed any mixture of such compounds which are individually suitable. Both the saturated and unsaturated halogenated hydrocarbons should be used within the cited proportions of 1.0–6.5% based on the weight of monomers. Other known molecular-weight-controlling additives may also be used, such as p-toluene, sulfonyl chloride, $Br_2H_2CCOOC_2H_5$, N-chlorophthalimide, formaldehyde and the like. Likewise the same result may be secured by carrying out the polymerization at relatively high temperatures, in the range of 70°–85° C., preferably 74°–77° C., instead of the customary lower temperatures on the order of 50°–65° C., in which case the additives may be omitted or minimized to meet various molecular weight specifications. It is preferred to keep the temperature not above 80° C., as the polymers produced above these temperatures contain large quantities of agglomerate and hard, seedy particles which are commercially undesirable. The degree to which the molecular weight is modified in this way will naturally have some effect on the location of the contours HIK in the drawings, although within the usual practical limits this effect is small and may be neglected. The contour HK remains substantially unvarying. Dropping the trichloroethylene component from the level of about 3%, used in Example XII to 1.0% will displace the contour HI approximately 10 units away from the alkyl acrylate or methacrylate vertex, and will displace the contour IK approximately 10 units away from the vinyl chloride vertex. The displacements are roughly linear functions of the amount of the trichloroethylene used, over the range 1.0–6.5%, based on the weight of monomers (A), (B), (C) and (D).

SUBORDINATE COMONOMERS

As noted above, the copolymers of this invention may contain copolymerized therein, in addition to the essential vinyl chloride, dihydrocarbon esters, monohydrocarbon esters, acrylates and methacrylates, and in addition to the molecular weight reducing agents if these be present, other extraneous monomers copolymerizable with vinyl chloride. Any such extraneous monomers should be present in quantities small enough, say up to 20%, based on the total weight of the copolymers, so as not to obliterate the essential character of the underlying vinyl chloride copolymeric structure of the invention. Suitable extraneous monomers of this character include for instance, vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like, and conjugated and cross-conjugated ethylenically unsaturated compounds such as butadiene, isoprene, chloroprene, 2,3-dimethylbutadiene-1,3-piperylene, divinyl ketone and the like. For a fairly complete list of materials known to polymerize with vinyl chloride, reference may be had to Krczil "Kurzes Handbuch Der Polymerisations—Technik—II Mehrstoff Polymerisation" Edwards Bros. Inc. 1945 pp. 735–747, the items under "Vinyl Chlorid." As a rough rule, the criterion of a practical comonomer for use with vinyl chloride to produce copolymers containing 80% or more of vinyl chloride, is that (on a mole percentage basis) an initial charge of 96% vinyl chloride, balance comonomer, shall yield an initial copolymer containing (a) at least 90% vinyl chloride and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $$Q_{vinyl\ chloride} = .03 \text{ and } e_{vinyl} = .3$$

$$4.1 > \frac{.029 e/Q_2^{-.3(.3-e_2)} + .04}{1.33 Q_2 e_2^{(.3-e_2)} + .96} > .37$$

Instead of the single unsaturated comonomers of the type above indicated, mixtures of such comonomers may enter into the copolymers, it being understood that the total quantity thereof shall be small enough (i.e., not over 20% based on the weight of the copolymer) that the essential character of the polyvinyl chloride chain is retained.

The resins of this invention are readily soluble to yield concentrated solutions in relatively cheap solvents and solvent compositions, to yield coating compositions which upon evaporation will deposit tightly adherent coatings on metallic and other surfaces. Desirable primary solvents for use in the coating compositions of this invention include all of the usual vinyl resin solvents, such as ketone solvents on the order of dimethyl ketone, methyl ethyl ketone, methyl isopropyl ketone, acetyl acetone, cyclohexanone, acetonyl acetone and the like; ester solvents such as ethyl acetate, amyl acetate, ethyl butyrate and the like; and miscellaneous solvents such as the nitroparaffins, tetrahydrofuran and the like. The resins of this invention tolerate considerable amounts of relatively poor solvency hydrocarbon diluents such as toluene, xylene, benzene, mineral spirits and VM and P naphtha. The ketone solvents named above will tolerate considerable amounts of such diluents while retaining the resins of this invention in solution; ratios of hydrocarbon: ketone as high as 9:1 by weight may be employed, with concentrations of resin as high as 25% by weight. The resins form smooth and homogenous solutions in these solvents along with alkyd resins, and homogenous films are deposited from such solutions. The resins are tightly adherent to all of the usual substrates upon which they may be coated. Coatings so deposited are desirably hard, durable, and mar- and chemical resistant, but nevertheless are sufficiently flexible and extensible to permit extensive deformation and elongation of the substrate without rupture of the coating. The resins and coatings of this invention are used in coating compositions and paints for sheet metal, such as sheet steel, aluminum, or magnesium, and are especially useful when the coated sheet metal is subjected to bending, drawing, punching, stretching and other operations, which they withstand without rupture. The chemical and weather resistance render the resins suitable for coating sheet metallic items subjected to outside exposure, such as automobile body components, vending and dispensing machine housings, parking meters, fallout shelters, septic tanks, tractors and the like. In view of their flexibility and excellent adhesion to a wide variety of surfaces, the resins of this invention may be used as adhesive interlayers for joining steel, aluminum, magnesium, brass and other metals, wood, plastics and the like.

With the foregoing general discussion in mind, there are given herewith detailed examples of the practice of this invention.

EXAMPLE I

| | | |
|---|---|---|
| Water (de-ionized) | ml | 110 |
| Vinyl chloride | g | 42 |
| Di-n-butyl maleate | g | [1] 4–10 |
| Mono-hydrogen mono-n-butyl maleate | g | 5 |
| 2-ethyl hexyl acrylate | g | [1] 3–13 |
| Trichloroethylene | g | [1] 2 |
| Benzoyl peroxide | g | 0.5 |
| Phosphate of a polymeric 2-(di-methylamino) ethyl methacrylate ("GM-650," a product of Rohm & Haas Co.) | g | 0.05 |

[1] (Per Table I.)

A series of polymers was made in accordance with the foregoing recipe, varying the proportions of di-n-butyl maleate, 2-ethyl hexyl acrylate, and trichloroethylene in the several runs as set forth in Table I. In each case the ingredients were charged in the order listed into a beverage bottle, the free space of which had been purged by the evaporation of vinyl chloride, and the bottle closed with an aluminum-foil-lined crown cap and tumbled in a water bath at 65° C. for 18 hours. At the end of this time the bottles were vented and opened, and the polymer recovered from the slurry by filtration, followed by repeated washing on the filter with deionized water and drying in an oven.

All of the resins were in the form of spherical granules and were soluble in toluene to the extent of at least 25% by weight of the solution, and all showed excellent tight adhesion to sheet steel when coated from a 25% solution in methyl ethyl ketone, brushed on and dried. The relative viscosity of the resins in 1% cyclohexanone solution was determined. Alkyd compatibility was also tested for each resin by mixing equal parts of a 25% solution of the resin in methyl ethyl ketone and a 50% solution of a commercial alkyd resin in xylene, coating this composition upon a sand-blasted steel plate, drying, and subjectively evaluating the clarity of the film. Likewise the flexibility of the resin was determined by pressing out a plaque of the resin in a laboratory press at 180° C. to a thickness of approximately 0.01 inch, and manually flexing and creasing, the operator's comments being recorded as "flexibility." Set forth herewith in Table I are the proportions of the variable monomer ingredients employed, together with the properties of the products.

*Table I*

| Variable monomers used (grams) | | Relative viscosity | Alkyd compatibility | Flexibility | Run No. |
|---|---|---|---|---|---|
| Dibutyl maleate | Ethyl hexyl acrylate | | | | |
| 4 | 9 | 1.42 | Fair | Excellent | 1 |
| 6 | 7 | 1.39 | Good | Good | 2 |
| 8 | 5 | 1.34 | Good | Good | 3 |
| 10 | 3 | 1.32 | Good | Fair | 4 | and films deposited on sand-blasted steel had extremely tight adhesion thereto. Set forth herewith in Table II are the monomer proportions used and the other properties of the resins.

*Table II*

| Variable monomers used (grams) | | Relative viscosity | Alkyd compatibility | Flexibility | Run No. |
|---|---|---|---|---|---|
| Dibutyl maleate | Butyl acrylate | | | | |
| 5 | 8 | 1.42 | Fair | Slightly brittle. | 5 |
| 6.5 | 6.5 | 1.39 | Good | Slightly brittle. | 6 |

EXAMPLE III

Water (distilled) _____ml__ 100
Vinyl chloride _____g__ [1] 43–46
Di-n-butyl maleate _____g__ [1] 4–5
Mono-hydrogen mono-n-butyl maleate __g__ 5
2-ethyl hexyl acrylate _____g__ [1] 5–8
Trichloroethylene _____g__ [1] 1–3
Benzoyl peroxide _____g__ 0.5
Copolymer of methyl vinyl ether and maleic anhydride _____g__ 0.10

[1] (Per Table III.)

A series of resins was prepared in accordance with the foregoing recipe, using the ingredients in the proportions set forth in Table III in the several runs. Each run was conducted, and the product evaluated, as described in Example I. All of the products formed 25% solutions in toluene and 35% solutions in methyl ethyl ketone, and films coated upon sheet steel from these solutions had excellent adhesion thereto. Set forth herewith in Table III are the quantities of the variable monomers, and the properties of the resin products, in the several runs.

*Table III*

| Variable monomers used (grams) | | | | Flexibility | Relative viscosity in 1% cyclohexanone | Run No. |
|---|---|---|---|---|---|---|
| Vinyl chloride | Dibutyl maleate | Ethyl hexyl acrylate | Trichloroethylene | | | |
| 43 | 4 | 8 | 2 | Excellent | 1.45 | 7 |
| 44 | 4 | 7 | 2 | Good | 1.44 | 8 |
| 44 | 4 | 7 | 2.5 | Fair | 1.41 | 9 |
| 45 | 5 | 5 | 1 | Fair | 1.50 | 10 |
| 46 | 4 | 5 | 3 | Fair | 1.38 | 11 |

EXAMPLE II

Water (distilled) _____ml__ 110
Vinyl chloride _____g__ 42
Di-n-butyl maleate _____g__ 6.5 or 5
Mono-hydrogen, mono-n-butyl maleate __g__ 5
n-Butyl acrylate _____g__ 6.5 or 8
Trichloroethylene _____g__ 2
Benzoyl peroxide _____g__ 0.5
Phosphate of polymeric 2-(dimethylamino) ethyl methacrylate ("GM-650," a product of Rohm & Haas Co.) _____g__ 0.05

Two runs were made in accordance with the foregoing recipe, using the di-n-butyl maleate and n-butyl acrylate in the proportions set forth in Table II. The polymerization was carried out and the products evaluated, as described in Example I. The products were soluble to the extent of 25% in toluene and 35% in methyl ethyl ketone,

EXAMPLE IV

Water (distilled) _____ml__ 100
Vinyl chloride _____g__ [1] 42 to 43
Di-n-butyl maleate _____g__ [1] 4 to 10
Mono-hydrogen mono-n-butyl _____g__ [1] 3 to 5
2-ethyl hexyl acrylate _____g__ [1] 5 to 8
Trichloroethylene _____g__ [1] 0 to 1
Benzoyl peroxide _____g__ 0.5
Solution of polymer of 2-diethylamino ethyl methacrylate (aqueous solution containing 15% solids; contains 16% of phosphoric acid, based on the weight of polymer)__ 0.1

[1] (Per Table IV.)

A series of polymers was prepared in accordance with the above recipe varying the monomeric ingredients as indicated in Table IV. The polymerization and evaluation was carried out as described in Example I, and all products were soluble to the extent of 25% in toluene and 35% in methyl ethyl ketone, and had the same excellent adhesion to steel in coatings, as characterized the resins produced in the preceding examples. Tabulated herewith are the quantities of monomers employed, and the other properties of the resins.

Table IV

| Monomers used (grams) | | | | | Relative viscosity in 1% cyclohexanone | Flexibility | Run No. |
|---|---|---|---|---|---|---|---|
| Vinyl chloride | Dibutyl maleate | 2-Ethyl hexyl acrylate | Monohydrogen monobutyl maleate | Trichloroethylene | | | |
| 43 | 4 | 8 | 5 | 1.0 | 1.53 | Fair | 12 |
| 42 | 8 | 5 | 5 | 0.5 | 1.52 | Fair | 13 |
|  |  | 7 | 3 | 0.5 | 1.54 | Slightly brittle | 14 |
|  |  |  |  | 0.0 | 1.63 | Slightly brittle | 15 |
|  | 10 | 5 | 3 | 0.0 | 1.59 | Slightly brittle | 16 |
|  |  |  |  | 0.5 | 1.53 | Slightly brittle | 17 |
|  |  |  |  | 1.0 | 1.48 | Slightly brittle | 18 |

EXAMPLE V

[Temperature and Trichloroethylene Series]

Water (distilled) _____ml__ 100
Vinyl chloride _____g__ 42
Di-n-btuyl maleate _____g__ 4
Mono-hydrogen mono-n-butyl maleate ____g__ 5
2-ethyl hexyl acrylate _____g__ 9
Trichloroethylene _____g__ [1] 2.5–4.0
Solution of polymer of 2-(diethylamino)ethyl methacrylate _____g__ [2] .10
Benzoyl peroxide _____g__ 0.5

[1] (Per Table V.)
[2] (As solids in solution.)

A series of polymerizations was carried out in accordance with the above recipe, using the polymerization process and evaluation methods of Example I, with the exception that the runs were carried out at 55° C. and 60° C. as set forth in Table V, instead of the 65° C. used in Example I. The polymers were all strongly adhesive to steel, and were soluble to the extent of 25% in toluene and 35% in methyl ethyl ketone. Set forth herewith in Table V are the temperatures at which the polymerizations were run, the amounts of trichloroethylene used, and the properties of the products.

Table V

| Temperature (°C.) | Trichloroethylene used (g.) | Flexibility | Relative Viscosity in 1% cyclohexanone solution | Run No. |
|---|---|---|---|---|
| 55 | 2.5 | ---------- | 1.48 | 19 |
|  | 3.0 | ---------- | ---------- | 20 |
|  | 3.5 | ---------- | 1.44 | 21 |
|  | 4.0 | ---------- | 1.43 | 22 |
| 60 | 2.5 | ---------- | 1.45 | 23 |
|  | 3.0 | Flexible | 1.40 | 24 |
|  | 3.5 | Flexible | 1.39 | 25 |

EXAMPLE VI

Water (distilled) _____ml__ 150
Vinyl chloride _____g__ 70
Di-n-butyl maleate _____g__ 12.5
Mono-hydrogen mono-n-butyl maleate ____g__ 4.2
2-ethyl hexyl acrylate _____g__ 15.0
Trichloroethylene _____g__ 3.3
Benzoyl peroxide _____g__ 0.9
Phosphate of a polymeric 2-(dimethylamino) ethyl methacrylate ("GM-650," a product of the Rohm & Haas Co.) _____g__ 0.10

The above ingredients were charged into a polymerization bottle, which was then flushed with nitrogen, sealed, and tumbled in a water bath at 65° C. for 24 hours. The bottle was then vented, and the polymer recovered by filtration of the slurry followed by washing on the filter with de-ionized water and drying. The resin had the same excellent properties characterizing the resins of the preceding examples.

EXAMPLE VII

Water (distilled) _____ml__ 150
Vinyl chloride _____g__ 70
Di-n-butyl maleate _____g__ 12–15
Mono-hydrogen mono-n-butyl maleate ____g__ 1–3
2-ethyl hexyl acrylate _____g__ 14–16
Trichloroethylene _____g__ 3.3
Benzoyl peroxide _____g__ 1.0
Phosphate of 2-(dimethylamino) ethyl methacrylate (GM-650, a product of the Rohm & Haas Co.) _____g__ .1

A series of polymerizations was run in accordance with the foregoing recipe, varying the maleate and acrylate esters as set forth in Table VI below. The polymerization and recovery procedure of Example I was followed in each case. All of the polymers had the excellent properties characterizing the products of the preceding examples.

Table VI

| Amount of monomers used (grams) | | | Run No. |
|---|---|---|---|
| Dibutyl maleate | Mono-hydrogen monobutyl maleate | Ethyl hexyl acrylate | |
| 12 | 2 | 16 | 27 |
| 15 | 1 | 14 | 28 |
| 12 | 3 | 15 | 29 |

EXAMPLE VIII

[Solution polymerization; styrene copolymerization]

| | | |
|---|---|---|
| Vinyl chloride | g | 23 |
| Di-n-butyl maleate | g | 4 |
| Mono-hydrogen mono-n-butyl maleate | g | 1 |
| 2-ethyl hexyl acrylate | g | 5 |
| Trichloroethylene | g | 1.4 |
| Benzoyl peroxide | g | 1 |
| Toluene | ml | 120 |
| Styrene | ml | 0–5 |

Two runs were made in accordance with the foregoing recipe, one with and one without the styrene. Both runs were initiated without the presence of the styrene, all of the ingredients (excepting the styrene) being charged into a polymerization bottle, which was then purged by evaporation of a small amount of the monomers, sealed, and tumbled in a water bath at 65° C. The styrene was injected into the bottle selected for styrene copolymerization at the end of 16 hours, and both bottles were further tumbled for a total of 30 hours from the initiation of tumbling. The bottles were then opened, and the polymers precipitated from the solutions thereof by addition of isopropyl alcohol, and recovered by filtration, followed by washing successively with isopropyl alcohol and water on the filter. The resins were then dried in an oven. Both resins had the same excellent characteristics of the resins of the preceding examples.

EXAMPLE IX

[Large scale preparation]

| | | |
|---|---|---|
| Water (de-ionized) | gallons | 24 |
| Vinyl chloride | lbs | 70 |
| Di-n-butyl maleate | lbs | 12 |
| Mono-hydrogen mono-n-butyl maleate | lbs | 3 |
| 2-ethyl hexyl acrylate | lbs | 15 |
| Trichloroethylene | lbs | 3.3 |
| Polymeric diethylamino ethyl methacrylate phosphate solution[1] | lbs | 1.2 |
| Phosphoric acid | lb | .3 |
| Benzoyl peroxide | lb | .84 |

[1] Contains 12% solids, viscosity 3000 cps.

A fifty gallon stainless steel autoclave provided with a rotary anchor agitator, heating and cooling jacket and venting and charging lines were provided for the run. The water of the recipe was charged first into the reactor. The polymeric diethylamino ethyl methacrylate phosphate solution was thinned with sufficient water to make it flowable, the phosphoric acid added thereto, and this solution charged next. The maleate esters and trichloroethylene were next mixed together and charged into the reactor, followed by the vinyl chloride and benzoyl peroxide. The autoclave was then closed, the free space therein purged twice by evacuation and flooding with vinyl chloride vapor, agitation at an intensity of 11 on the Pfaudler scale commenced and contiued throughout the reaction, and the temperature adjusted to 65° C., which conditions were continued for 16 hours. At the end of this time, the unpolymerized vinyl chloride was vented, and the batch cooled to 25° C. The slurry of resin contained 33% solids and had a pH of 2.5. The resin was recovered from the slurry by filtration on a centrifugal filter, washed twice on the filter with deionized water, and dried on a tray drier at 95° C. Following are the properties of the resin.

Screen analysis:
| | |
|---|---|
| percent retained on 60 mesh | 70 |
| percent retained on 100 mesh | 10 |
| percent retained on 200 mesh | 10 |
| percent passed through | 10 |
| Bulk density, g./ml. | 0.56 |
| Relative viscosity in 1% cyclohexanone solution | 1.42 |

A solution comprising 50 grams of toluene, 25 grams of methyl isobutyl ketone and 25 grams of the resin was clear, showed no more than 2.3 seeds per ml. and had a viscosity of 50 cps. Coatings formed by spraying the solution on sand blasted and vapor-degreased 20-gauge sheet steel and drying adhered tightly thereto, and the underlying sheet steel could be drawn to moderate depths and bent to form sheet metal seam locks without rupture of the film.

EXAMPLE X

Example IX was exactly repeated, except that the amounts of vinyl chloride, maleate esters, acrylate esters and trichloroethylene were as follows:

| | | |
|---|---|---|
| Vinyl chloride | pounds | 70 |
| Di-n-butyl maleate | do | 6.67 |
| Mon-hydrogen mono-n-butyl maleate | do | 8.35 |
| 2-ethyl hexyl acrylate | do | 15 |
| Trichloroethylene | do | 4 |

The remainder of the ingredients were the same as in the recipe for Example IX. Following are the properties of the product.

Screen analysis:
| | |
|---|---|
| percent retained on 60 mesh | 53 |
| percent retained on 100 mesh | 38 |
| percent retained on 200 mesh | 4 |
| Bulk density, grams/cc. | .57 |
| Relative viscosity | 1.48 |
| Adhesion | Good |
| Viscosity of 25% solution in methyl ethyl ketone cps | 60 |
| Viscosity of solution containing 50% toluene, 25% methyl isobutyl ketone, 25% resin cps | 173 |
| Specific gravity | 1.29 |

EXAMPLE XI

| | | |
|---|---|---|
| Water (distilled) | ml | 150 |
| Vinyl chloride | g | 55–75 |
| Di-n-butyl maleate | g | 5–20 |
| Mono-hydrogen mono-n-butyl maleate | g | 2–10 |
| 2-ethyl hexyl acrylate | g | 5–20 |
| Trichloroethylene | ml | 2.8 |
| Benzoyl peroxide | g | .8 |
| Phosphate of polymeric 2-(dimethylamino) ethyl methacrylate ("GM-650," a product of the Rohm & Haas Co.) | g | .05 |

A series of runs was made in accordance with the foregoing recipe, varying the monomeric components from run to run as indicated in Table VII. In each case the water and vinyl chloride (the latter in slight excess of the tabulated amount) were charged into a tarred beverage bottle, and the vinyl chloride permitted to evaporate down to the tabulated amount so as to purge the bottle. The other ingredients were then charged, and the bottle sealed with an aluminum foil lined crown cap and tumbled in a water bath at 60° C. for 24 hours. At the end of this time, the cap was punctured to vent any unreacted vinyl chloride, the bottle was opened, and the polymer filtered off, washed on the filter with distilled water, and dried. In every case, there was obtained a resin which formed a clear solution consisting of 72 grams of toluene, 8 grams of methyl ethyl ketone, and 20 grams of resin. Films coated and dried upon sheet steel from these solutions were tightly adherent to the steel, and withstood the usual sheetmetal forming operations without rupture. Plaques were pressed from the resins in a laboratory press at 180° C. for 30 seconds, cooled in the press, aged for 24 hours, and manually flexed and creased, the operator's comments being recorded as "flexibility." Set forth herewith in Table VII are the amounts of monomers used in the several runs, and the operator's comments thereon.

Table VII

| Monomers used (grams) | | | | Flexibility | Run No. |
|---|---|---|---|---|---|
| Vinyl chloride | Dibutyl maleate | Hydrogen butyl maleate | Ethyl hexyl acrylate | | |
| 55 | 20 | 5 | 20 | Very pliable | 33 |
| 55 | 17.5 | 10 | 17.5 | Very pliable | 34 |
| 75 | 11.5 | 2 | 11.5 | Hard, flexible | 35 |
| 75 | 5 | 2 | 118 | Tough, flexible | 36 |
| 75 | 18 | 2 | 5 | Hard, borderline flexibility | 37 |

EXAMPLE XII

| | |
|---|---|
| Vinyl chloride | Total weight 300 grams; percentages of each monomer per Table VIII. |
| Di-n-butyl maleate | |
| 2-ethyl hexyl acrylate | |
| Mono-n-butyl monohydrogen maleate | |
| Trichloroethylene | 6 ml. |
| Benzoyl peroxide | 2 grams. |
| Phosphate of a polymeric 2-(dimethylamino) ethyl methacrylate ("GM-650," a product of Rohm & Haas Co.) Furnished as a 1% solution in water | 0.6 gram (dry weight). |
| Water | 450 grams. |

A series of polymerization runs was carried out in accordance with the foregoing recipe, varying the monomers from run to run as indicated in Table VIII. In each run a quart beverage bottle was used as the reaction vessel. The benzoyl peroxide, phosphate of the polymeric 2-(diethylamino)ethyl methacrylate, trichloroethylene and water were charged first, and the charge frozen. Thereafter the remaining monomers, in the proportions chosen for the run (except that the vinyl chloride was in slight excess) were charged, and the bottle warmed to boil off the vinyl chloride down to the weight chosen for the run, the vapors also serving to purge the free space in the bottle. The bottle was then closed with a crown cap and the bottle placed upon a wheel which revolved and dipped the bottle in a water bath at 65° C. for 24 hours. At the end of this time the bottle was removed from the wheel, cooled and vented, and the contents of the bottle filtered to recover the polymer. The polymer was twice re-slurried with water and sucked dry on a filter, and then dried in a circulating air oven at 50° C. Properties of the polymer were determined as follows.

*Plasticity.*—A one-half-gram sample was pressed out between cellophane sheets in a flat platen laboratory press under a total load of 2515 pounds on the plaque, with platen temperature of 120° C. The plasticity was reported as the area, in square millimeters, of the plaque as measured by a planimeter.

*Solubility (Viscosity).*—The solubility of the resin was considered to be reflected in the viscosity of a 20% solution of the resin in a solvent containing 90% toluene and 10% methyl ethyl ketone. The viscosity, in centipoises was determined at 25° C. by means of a Model LVT Brookfield Viscosimeter, using the No. 2 spindle at 30 r.p.m.

*Flexural modulus.*—This was determined by means of the method of A.S.T.M. D747-50.

The particulars of the several runs, together with the properties of the polymers, are set forth herewith in Table VIII. The properties are also plotted as contours in FIG. 1, as discussed above.

Table VIII

| Run No. | Monomer composition | | | | | | | | Properties of product | | |
|---|---|---|---|---|---|---|---|---|---|---|---|
| | Percent based on A+B+C+D | | | | | Percent based on A+B+C | | | Viscosity (cps.) | Flexural modulus (p.s.i.) | Plasticity (mm.²) |
| | A Vinyl chloride | B Dibutyl maleate | C 2-ethyl hexyl maleate | D Monobutyl monohydrogen maleate | E C₂HCl₃, pts. | A Vinyl chloride | B Dibutyl maleate | C 2-ethyl hexyl maleate | | | |
| 1 | 62.5 | 9.5 | 25 | 3 | 2 | 64.5 | 9.8 | 25.8 | 150 | (¹) | 2,100 |
| 2 | 75 | 12 | 10 | 3 | 2 | 77.3 | 12.4 | 10.0 | 100 | 149,000 | 2,410 |
| 3 | 77.5 | 7 | 12.5 | 3 | 2 | 80.0 | 7.2 | 12.9 | 65 | 115,000 | 2,120 |
| 4 | 72.5 | 5.5 | 20 | 3 | 2 | 74.7 | 5.67 | 20.6 | 320 | 13,000 | 2,050 |
| 5 | 70 | 27 | 0 | 3 | 2 | 72.1 | 27.8 | 0 | 25 | 290,000 | 3,600 |
| 6 | 62.5 | 19.5 | 15 | 3 | 2 | 64.4 | 20.1 | 15.5 | 40 | 2,1300 | 3,720 |
| 7 | 80 | 12 | 5 | 3 | 2 | 82.5 | 12.4 | 5.16 | 55 | 246,000 | 2,000 |
| 8 | 77.5 | 19.5 | 0 | 3 | 2 | 79.3 | 20.1 | 0 | 35 | 302,000 | 2,600 |
| 9 | 67.5 | 19.5 | 10 | 3 | 2 | 69.6 | 20.1 | 10.3 | 45 | 51,700 | 3,210 |
| 10 | 65 | 12 | 20 | 3 | 2 | 67.0 | 12.4 | 20.6 | 75 | 14,000 | 2,670 |
| 11 | 65 | 2 | 30 | 3 | 2 | 67.0 | 2.04 | 30.9 | 1,000 | (¹) | 2,270 |
| 12 | 70 | 12 | 15 | 3 | 2 | 72.1 | 12.4 | 15.5 | 120 | 43,000 | 2,500 |
| 13 | 72.5 | 9.5 | 10 | 8 | 2 | 78.8 | 10.3 | 10.9 | 80 | 230,000 | 2,000 |
| 14 | 80 | 7 | 5 | 8 | 2 | 87.0 | 7.6 | 5.4 | 240 | 254,000 | 1,650 |
| 15 | 77.5 | 2 | 12.5 | 8 | 2 | 84.2 | 2.2 | 13.6 | 305 | 145,000 | 1,600 |
| 16 | 75 | 12 | 3 | 8 | 2 | 83.4 | 13.3 | 3.3 | 75 | 275,000 | 1,980 |
| 17 | 70 | 2 | 20 | 8 | 2 | 76.2 | 2.2 | 21.7 | 650 | 16,800 | 1,870 |
| 18 | 67.5 | 14.5 | 10 | 8 | 2 | 73.3 | 15.8 | 10.9 | 40 | 18,200 | 2,750 |
| 19 | 62.5 | 14.5 | 15 | 8 | 2 | 68.0 | 15.8 | 16.3 | 35 | 59,800 | 3,100 |
| 20 | 62.5 | 4.5 | 25 | 8 | 2 | 68.0 | 4.9 | 27.2 | 155 | 4,000 | 2,500 |
| 21 | 77.5 | 14.5 | 0 | 8 | 2 | 84.2 | 15.8 | 0 | 35 | 332,000 | 2,340 |
| 22 | 65 | 9.5 | 17.5 | 8 | 2 | 70.7 | 10.3 | 19.2 | 60 | 36,200 | 2,580 |
| 23 | 60 | 9.5 | 22.5 | 8 | 2 | 65.2 | 9.5 | 22.5 | 60 | (¹) | 3,040 |
| 24 | 70 | 22 | 0 | 8 | 2 | 76.2 | 23.8 | 0 | 30 | 205,000 | 2,860 |
| 25 | 70 | 6.7 | 15 | 8.3 | 2 | 76.5 | 7.2 | 16.3 | 110 | 44,600 | 2,340 |

¹ Too soft to measure.

From the foregoing general discussion and detailed specific examples, it will be seen that this invention provides novel vinyl chloride resins which are soluble in convenient and inexpensive solvents to provide solutions from which there may be deposited films which are tightly adherent to the surfaces to which they are applied; compatible with alkyds with which it is desirable to formulate such coatings; and hard and mar-resistant, but nevertheless sufficiently flexible to permit bending, drawing and other fabricating operations to be performed upon the substrates upon which they are coated. This application is a continuation-in-part of our application SN. 853,705 in which the compositional limits are set at (A) 55–80% vinyl chloride; (B) 3–18% of the dihydrocarbonyl ester; (D) 1–10% of the monohydrogen ester; and (C) 1–10% of the acrylate or methacrylate ester, all based on the sum of the weights of the components (A), (B), (C) and (D), the sum of the percentages of components (B) and (D) being from 10 to 22%. The definition of these limits by way of the areas on FIG. 1 as specified above, is believed to provide a more accurate measure of the true scope of the invention.

What is claimed is:

1. A vinyl chloride resin characterized by ready solubility, good adhesiveness, and flexibility, said resin being a copolymer of A. Vinyl chloride
B. An ester selected from the group consisting of di-hydrocarbonyl esters of monoethylenically unsaturated polymerizable dicarboxylic acids, which acids contain 4-10 carbon atoms, in which esters the esterifying hydrocarbonyl groups each contain 1-10 carbon atoms, and mixtures of such esters.
C. An ester selected from the group consisting of alkyl acryates and methacrylates in which the alkyl groups contain 6-12 carbon atoms and mixtures of said esters.

The percentages of A, B and C, based on the sum of the weights of A, B and C must lie within the area bounded by the figure HIK of Fig. 1. Total weight of A, B and C equals 90-99%

D. An ester selected from the group consisting of monohydrogen, mono-hydrocarbonyl esters of monoethylenically unsaturated polymerizable dicarboxylic acids, which acids contain 4-10 carbon atoms, in which esters the esterifying hydrocarbonyl groups contain 1-10 carbon atoms, and mixtures of such esters____ 10-1%

Based on the weight of A, B, C and D.

said resin having a relative viscosity, in 1% solution in cyclohexanone, of 1.1 to 1.7 at 25° C.

2. A vinyl chloride resin characterized by ready solubility, good adhesiveness, and flexibility, said resin being a copolymer of A. Vinyl chloride
B. An ester selected from the group consisting of di-hydrocarbonyl esters of monoethylenically unsaturated polymerizable dicarboxylic acids, which acids contain 4-10 carbon atoms, in which esters the esterifying hydrocarbonyl groups each contain 1-10 carbon atoms, and mixtures of such esters.
C. An ester selected from the group consisting of alkyl acrylates and methacrylates in which the alkyl groups contain 6-12 carbon atoms and mixtures of said esters.

The percentages of A, B and C, based on the sum of the weights of A, B and C must lie within the area bounded by the figure HIK of Fig. 1. Total weight of A, B and C equals 90-99%

D. An ester selected from the group consisting of monohydrogen, mono-hydrocarbonyl esters of monoethylenically unsaturated polymerizable dicarboxylic acids, which acids contain 4-10 carbon atoms, in which esters the esterifying hydrocarbonyl groups contain 1-10 carbon atoms, and mixtures of such esters____ 10-1%
E. Trichloroethylene_____ 1.0-6.5% based on the total weight of A, B, C and D.

Based on the weight of A, B, C and D.

said resin having a relative viscosity, in 1% solution in cyclohexanone, of 1.1 to 1.7 at 25° C.

3. A vinyl chloride resin characterized by ready solubility, good adhesiveness, and flexibility, said resin being a copolymer of A. Vinyl chloride
B. Di-n-butyl maleate
C. 2-Ethyl hexyl acrylate The percentages of A, B and C, based on the sum of the weights of A, B and C, must lie within the area bounded by the figure HIK of Fig. 1. Total weight of A, B and C equals 90-99%

D. Mono-hydrogen, mono-n-butyl maleate_____ 10-1%

Based on the weight of A, B, C and D.

said resin having a relative viscosity, in 1% solution in cyclohexanone, of 1.1 to 1.7 at 25° C.

4. A vinyl chloride resin characterized by ready solubility, good adhesiveness, and flexibility, said resin being a copolymer of A. Vinyl chloride
B. Di-n-butyl maleate
C. 2-Ethyl hexyl acrylate The percentages of A, B and C, based on the sum of the weights of A, B and C, must lie within the area bounded by the figure HIK of Fig. 1. Total weight of A, B and C equals 90-99%

D. Mono-hydrogen, mono-n-butyl maleate_____ 10-1%
E. Trichloroethylene_____ 1.0-7.6% (based on the weight of A, B, C and D).

Based on the weight of A, B, C and D.

said resin having a relative viscosity, in 1% solution in cyclohexanone, of 1.1 to 1.7 at 25° C.

5. A vinyl chloride resin characterized by ready solubility, good adhesiveness, and flexibility, said resin being a copolymer of approximately

| | Percent |
|---|---|
| A. Vinyl chloride | 70 |
| B. Di-n-butyl maleate | 12 |
| C. 2-ethyl hexyl acrylate | 15 |
| D. Mono-hydrogen, mono-n-butyl maleate | 3 |
| E. Trichloroethylene | [1] 3 |

[1] Based on the total weight of A, B, C and D.

said resin having a relative viscosity, in 1% solution in cyclohexanone, of 1.1 to 1.7 at 25° C.

6. A vinyl chloride resin characterized by ready solubility, good adhesiveness, and flexibility, said resin being a copolymer of approximately

| | Percent |
|---|---|
| A. Vinyl chloride | 70 |
| B. Di-n-butyl maleate | 7 |
| C. 2-ethyl hexyl acrylate | 15 |
| D. Mono-hydrogen, mono-n-butyl maleate | 8 |
| E. Trichloroethylene | [1] 4 |

[1] Based on the total weight of A, B, C and D.

said resin having a relative viscosity, in 1% solution in cyclohexanone, of 1.1 to 1.7 at 25° C.

7. A vinyl chloride resin characterized by ready solubility, good adhesiveness, and flexibility, said resin being a copolymer of approximately

| | Percent |
|---|---|
| A. Vinyl chloride | 70 |
| B. Di-n-butyl maleate | 7 |
| C. 2-ethyl hexyl acrylate | 15 |
| D. Mono-hydrogen, mono-n-butyl maleate | 8 |
| E. Trichloroethylene | [1] 2 |

[1] Based on the total weight of A, B, C and D.

said resin having a relative viscosity, in 1% solution in cyclohexanone, of 1.1 to 1.7 at 25° C.

8. A vinyl chloride resin characterized by ready solubility, good adhesiveness, and flexibility, said resin being a copolymer of approximately

|   | Percent |
|---|---|
| A. Vinyl chloride | 62.5 |
| B. Di-n-butyl maleate | 4.5 |
| C. 2-ethyl hexyl acrylate | 25 |
| D. Mono-hydrogen, mono-n-butyl maleate | 8 |
| E. Trichloroethylene | [1] 2 |

[1] Based on the total weight of A, B, C and D.

said resin having a relative viscosity, in 1% solution in cyclohexanone, of 1.1 to 1.7 at 25° C.

9. A vinyl chloride resin characterized by ready solubility, good adhesiveness, and flexibility, said resin being a copolymer of approximately

|   | Percent |
|---|---|
| A. Vinyl chloride | 67.5 |
| B. Di-n-butyl maleate | 19.5 |
| C. 2-ethyl hexyl acrylate | 10 |
| D. Mono-hydrogen, mono-n-butyl maleate | 3 |
| E. Trichloroethylene | [1] 2 |

[1] Based on the total weight of A, B, C and D.

said resin having a relative viscosity, in 1% solution in cyclohexanone, of 1.1 to 1.7 at 25° C.

10. A vinyl chloride resin characterized by ready solubility, good adhesiveness, and flexibility, said resin being a copolymer of approximately

|   | Percent |
|---|---|
| A. Vinyl chloride | 80 |
| B. Di-n-butyl maleate | 7 |
| C. 2-ethyl hexyl acrylate | 5 |
| D. Mono-hydrogen, mono-n-butyl maleate | 8 |
| E. Trichloroethylene | [1] 2 |

[1] Based on the total weight of A, B, C and D.

said resin having a relative viscosity, in 1% solution in cyclohexanone, of 1.1 to 1.7 at 25° C.

References Cited by the Examiner
UNITED STATES PATENTS

| 2,574,847 | 11/51 | Scheitz | 260—78.5 |
| 2,848,422 | 8/58 | Rowland et al. | 260—78.5 |
| 2,979,480 | 4/61 | Piloni et al. | 260—78.5 |

FOREIGN PATENTS 487,593  6/38  Great Britain.

JOSEPH L. SCHOFER, *Primary Examiner.*

JOSEPH R. LIBERMAN, *Examiner.*